United States Patent [19]  [11] 4,307,268
Harper  [45] Dec. 22, 1981

[54] TACTILE ELEMENT AND KEYBOARD INCLUDING THE TACTILE ELEMENT
[75] Inventor: William P. Harper, Phoenix, Ariz.
[73] Assignee: Rogers Corporation, Rogers, Conn.
[21] Appl. No.: 117,063
[22] Filed: Jan. 31, 1980

Related U.S. Application Data
[63] Continuation-in-part of Ser. No. 961,628, Nov. 17, 1978, Pat. No. 4,245,138.

[51] Int. Cl.³ .............................................. H01H 13/14
[52] U.S. Cl. ................................ 200/5 A; 200/159 B; 200/275; 200/292
[58] Field of Search .............. 200/5 A, 159 R, 159 A, 200/159 B, 275, 292

[56] References Cited
U.S. PATENT DOCUMENTS
3,898,421  8/1975  Suzumura ........................ 200/159 B
4,194,105  3/1980  Hodges ............................... 200/275

Primary Examiner—J. V. Truhe
Assistant Examiner—Morris Ginsburg
Attorney, Agent, or Firm—Fishman & Van Kirk

[57] ABSTRACT

A tactile snap-action element for use in keyboards, the element comprising an arcuately shaped invertible first dome and a second dome shaped actuating protrusion extending from the invertible second dome, the actuating dome protrusion being integral with the invertible dome and being non-invertible. The element is operated by an actuation force which acts directly or indirectly through the non-inverting second dome to invert the first dome and to provide tactile feedback. The keyboard includes a plurality of keys, each key comprising an element, a conductive circuit associated with the first dome and movable with the inversion of the first dome to electrically contact a second conductive circuit associated with the element.

23 Claims, 8 Drawing Figures

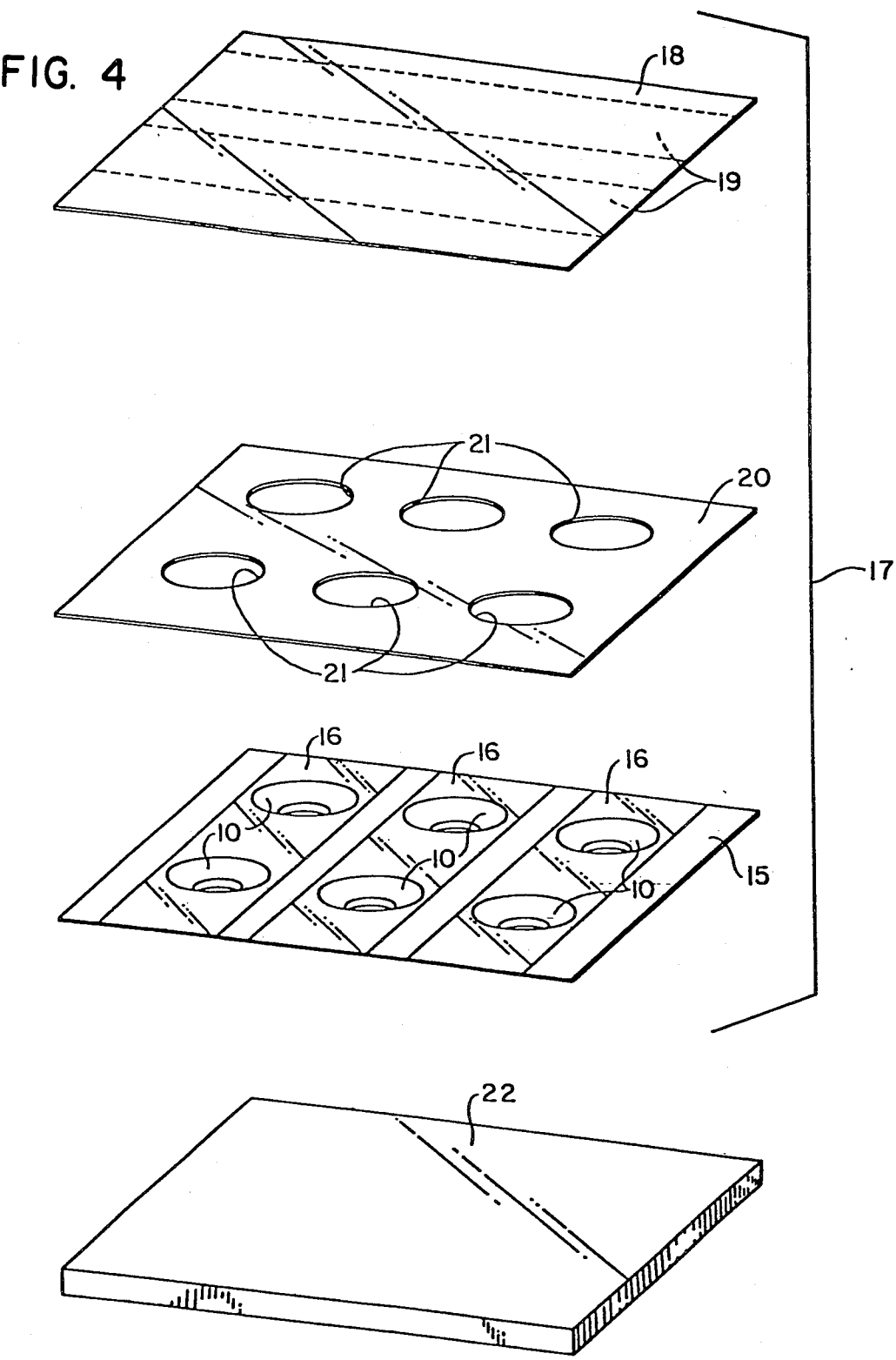

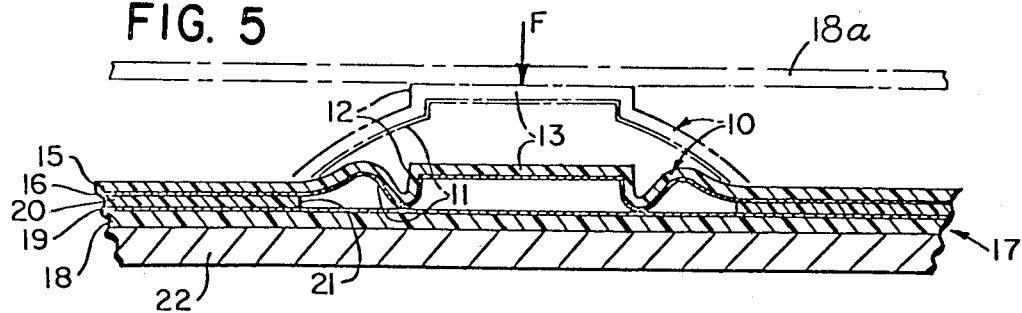
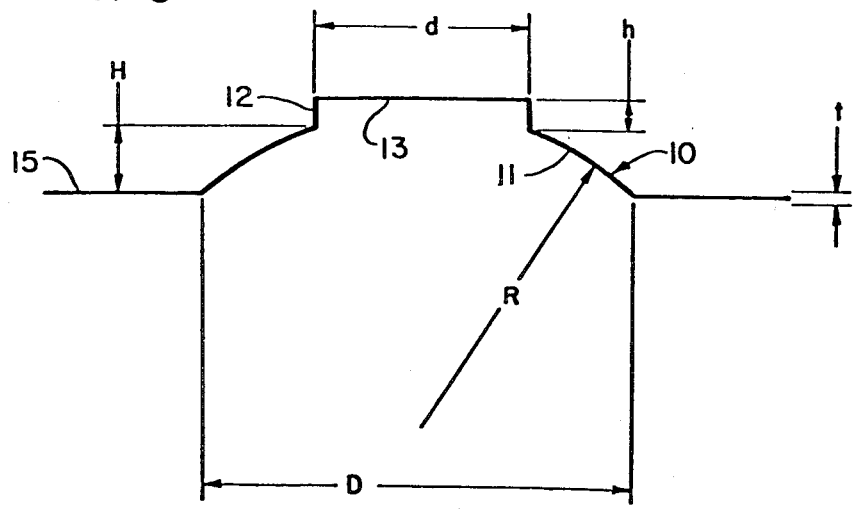

TACTILE ELEMENT AND KEYBOARD INCLUDING THE TACTILE ELEMENT

CROSS-REFERENCE TO RELATED APPLICATION

This is a continuation-in-part of application Ser. No. 961,628, filed Nov. 17, 1978, now U.S. Pat. No. 4,245,138.

BACKGROUND OF THE INVENTION (1) Field of the Invention

The present invention relates to keyboards including keys which provide tactile feedback to a person operating the keys. More particularly, the present invention relates to a snap-action element which provides tactile feedback. The element may be incorporated within each key of a keyboard having a plurality of keys. By way of example only, the keyboard has utility in retail outlets, airline terminals, fast-food restaurant terminals, data terminals and calculators.

(2) Description of the Prior Art

Prior art keyboards are of two basic types. One type of keyboard is an array of independent or discrete keys which are actuated to connect a circuit positioned beneath the keys. Typical uses for keyboards having discrete keys include hand held electronic calculators. The second type is a keyboard wherein a flat sheet of plastic has a legend printed thereon, the legend defining areas to be pushed to actuate keys positioned beneath the flat sheet of plastic.

In the keyboard of the type having a flat legend sheet, the legend sheet defines a plurality of points or areas on the sheet which the operator may press to actuate the key associated with the particular area or point. It is highly desirable that each key of the keyboard provide the operator of the key with tactile feedback when electrical connection is made by actuation of a key. The key which is positioned beneath the flat legend sheet provides for the connection of an electrical circuit and provides the operator of the key with tactile feedback when the electrical circuit is made.

One problem with prior art keyboards having flat legend sheets is that the keys positioned beneath the legend sheet have a complicated structure which requires many separate parts and which requires a large amount of time to assemble. The relatively large amount of time to assemble the keys is related not only to the large number of parts in the key, but also to the necessary alignment of the parts to insure proper actuation of the key. A typical keyboard includes a legend sheet which defines a plurality of points which the operator of the keyboard may push to actuate the keys located beneath the legend sheet. Typically, beneath the legend sheet is a second sheet having a plurality of small projections, the second sheet being aligned with the legend sheet to provide one projection for each legend point or area on the legend sheet. The projections face downwardly into the keyboard and provide for the actuation of an arcuately shaped discrete invertible metal dome. The keyboard includes a discrete or individual metal dome for each key. The domes are positioned on a printed circuit board which provides a first circuit which is connected to the periphery of the dome and a second circuit which is positioned beneath the center of the dome so that when the dome inverts, a connection is made between the two circuits. The individual metal domes are retained on the circuit board by adhesive tape having holes through which the upper portions of the domes protrude. The cost of such a keyboard is quite high due to the relatively high number of components, and the formidable assembly task. It should be understood that in the assembly of the prior art keyboard, the center of the domes had to be aligned precisely with the small projections in order for each key to provide for electrical connection and tactile feedback. Thus, a high level of precision is necessary in the method of assembly. Moreover, because of the numerous components, the keyboard is relatively thick and presents a cluttered appearance to the user of the keyboard. A thick keyboard requires a greater space to be provided on the surface on which the keyboard is to be mounted. Furthermore, this prior art keyboard has a tendency to register a double entry when the key is pressed. Double entry often results from misalignment of the dome with the small projections. Another reason for the double entry is that the domes of the prior art tend to oscillate or bounce when actuated thereby providing for double actuation of the key. The prior art key also tended to close without tactile feedback. Closing of the key without tactile feedback is often a result of misalignment of the small projection with respect to the dome. For example, if the small projection were positioned away from the center of the dome, the projection could actuate the key without providing the user with tactile feedback.

It should be understood that the keys are actuated by the operator pressing his finger against a point on the flat flexible legend sheet. The prior art switches had the disadvantage that the sheet had to be pressed at a point very close to the underlying projection which actuates the metal dome. With prior art keyboards, if the operator pressed his finger at a point removed from the underlying projection, not only was the desired key not actuated, but there was a significant possibility that an adjacent key would be actuated.

A second type of keyboard is of the type that includes many discrete keys. Such a keyboard is disclosed in U.S. Pat. No. 3,898,421. This patent discloses a keyboard wherein discrete keys may be pushed to invert an element comprising a spherical protuberance including an annular shoulder separated from a central portion by a flexural node to provide a double snap-action element. When the element is depressed by a force exerted on the central portion, the annular shoulder is moved and makes contact with a pair of fixed electrodes to make electrical contact and provide a first snap action. Thereafter, the central portion undergoes a second snap action whereby the central portion is positioned between the electrodes. It is a significant drawback of the element disclosed in this patent that the element undergoes two snap-actions. An operator using the key by having to press the key through two snap actions may be confused as to whether electrical contact was made once or whether electrical contact was made twice. Thus, it is undesirable to provide a central portion which is capable of inversion.

It is an object of the present invention to provide a keyboard having simplified and fewer components thereby allowing for simplified methods of assembly.

It is an object of the present invention to provide a keyboard wherein the domed actuators are not required to be aligned with actuating protrusions.

It is a further object of the present invention to provide a keyboard having keys wherein the tendency for double entry is reduced. It is another object of the present invention to reduce the possibility of the key closing without tactile feedback.

It is a further object of the present invention to provide keys which are less sensitive to the imposition of forces disposed from the center of the key. Restated, it is an object of the present invention to provde a key which may be actuated by a force imposed at an area of the legend sheet removed from the center of the actuator.

It is another object of the present invention to provide a keyboard whereby the legend sheet has a dual purpose in that the legend sheet defines actuating areas and also provides a conductive circuit.

It is a further object of the present invention to provide a keyboard having a reduced number of components thereby reducing material cost and assembly cost.

SUMMARY OF THE INVENTION

The present invention provides a keyboard including a plurality of keys, each key including a snap-action tactile actuator comprising a first arcuately shaped invertible dome wherein the dome includes a dome actuating protrusion which is integral with said dome and which is non-invertible. The actuating protrusion is relatively rigid in comparison to the dome and resists inversion under normal loading while the dome inverts under normal loading. In the preferred embodiment of the invention set forth herein, the dome actuating protrusion comprises a second arcuate or domed protrusion which is integral with the first dome and which extends from the center of the first dome. The second dome protrusion has a geometry which resists inversion under normal loading while the first dome has a geometry which inverts under normal loading.

It should be understood that the above described actuator is capable of being used in many conventional key applications known in the prior art. Although the actuator of the present invention is capable of being used in devices having independent or discrete keys such as hand held calculators and the like, the actuator of the present invention is particularly adapted for use in keyboards of the type having a legend sheet which is relatively flat and which has a legend printed thereon.

In a legend sheet type keyboard, the present invention provides a particularly novel keyboard. The keyboard includes first flexible sheet having a circuit pattern disposed on one surface thereof, the sheet further including a plurality of domed actuators which may be molded in and integral with the sheet. The first sheet having domed actuators thereon is aligned with a second sheet including printed circuitry, the circuitry on the first sheet facing and being aligned with the circuitry on the second sheet to provide for connection of the circuitry when the domed actuator is actuated. The second sheet may be flexible or stiff. Preferably, the two sheets are spaced apart and held in position by an insulating separator or adhesive which functions to insulate the circuits on the first sheet from the circuits on the second sheet except at points where the domed actuator will contact the second sheet when the domed actuator is actuated.

The keyboard is positioned so that the domed actuator protrudes toward the person operating the keyboard. In this instance, a legend sheet having a legend printed thereon is positioned above the dome actuators and the points on the printed legend are aligned with the actuators so that a person pressing the legend board deforms the actuator downwardly.

The method of assembling the keyboard of the present invention is particularly simple: the first flexible sheet of printed circuitry having the domes formed therein need only be aligned with a second sheet of printed circuitry with an insulating spacer therebetween, and the parts may be adhered together if desired.

BRIEF DESCRIPTION OF THE DRAWINGS

FIG. 4 is an exploded perspective view of a keyboard including the key shown in FIGS. 2 and 3;

FIG. 5 is a side sectional view of another embodiment of a key;

FIG. 6 is a schematic sectional view of the actuator shown in FIG. 1;

DETAILED DESCRIPTION OF THE INVENTION

Figure 1:
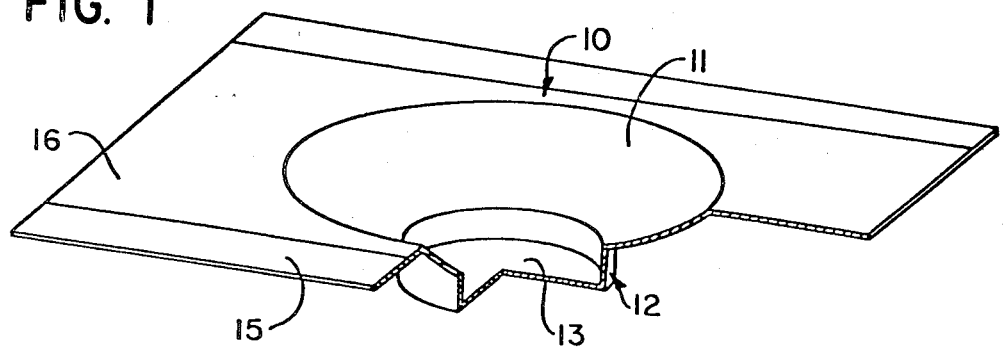
FIG. 1 shows a perspective view of an individual tactile element having one quarter of the element sectioned away.

Referring to FIG. 1, the snap-action tactile element 10 includes an arcuately shaped invertible dome 11 and a dome actuating protrusion 12 which is integral with the dome and which is noninvertible. Dome actuating protrusion 12 is rigid in comparison to dome 11 and resists inversion under normal loading while dome 11 inverts under normal loading. Protrusion 12 has a generally cylindrical shape which terminates in a flat circular surface 13. The cylindrical walls of the dome actuating protrusion 12 provide a geometry which resists inversion when an actuation force is directed along the longitudinal axis of the cylindrical walls. The dome has a geometry which inverts under normal loading. However, it should be noted that other shapes of dome actuating protrusions may be used provided the dome actuating protrusions do not invert when the actuator is operated. Actuator 10 is preferably molded by conventional means from a sheet of insulating material having conductive circuitry 16 formed thereon. The conductive circuitry will be referred to as "printed circuitry." It should be understood that the circuitry may be of a conventional type and may be formed by printed circuit techniques or other techniques known in the art such as, for example, conductive inking or die stamping. Printed circuitry 16 may cover all or a portion of the interior surface of actuator 10. Sheet 15 is preferably made from an insulating plastic material which is flexible and resilient. Sheet 15 is preferably made of polyester material sold by DuPont under the trademark MYLAR. Examples of other materials are: CELENAR (Celanese, Inc.); POLYSULFONE (Union Carbide); POLYETHER SULFONE (ICI, Inc.); and LEXAN (General Electric Co.).

Figure 2:
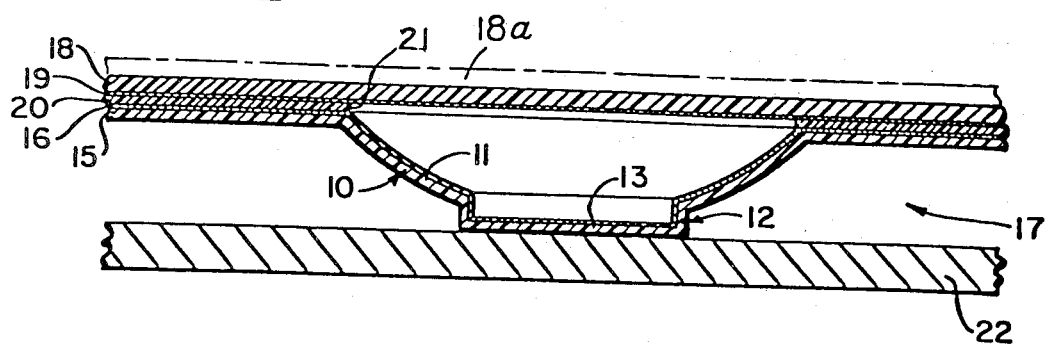
FIG. 2 shows a side sectional view of a key including the domed actuator shown in FIG. 1.
Figure 3:
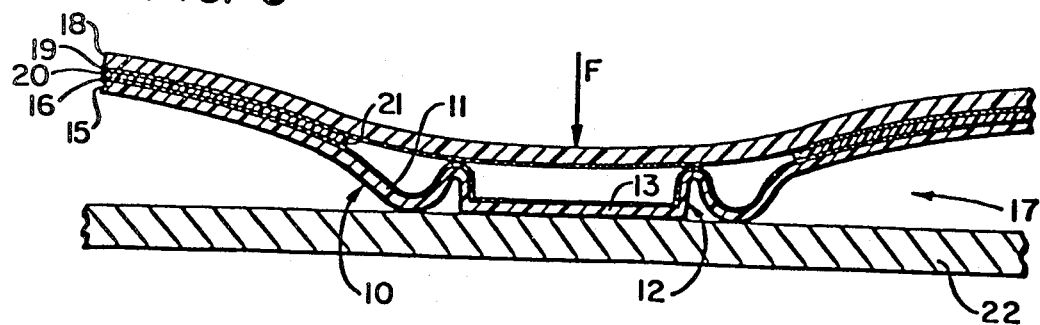
FIG. 3 shows a side sectional view of the key shown in FIG. 2, the key having been actuated.

Referring simultaneously to FIGS. 2, 3 and 4, a keyboard including a plurality of keys is shown. Keybord 17 includes a plurality of snap-action tactile elements 10 as previously described. Keyboard 17 includes a flexible sheet 18 having printed circuitry 19 on one side thereof.

Adhesive 20 insulates circuit 16 from circuit 19 and retains the sheets 15 and 18 in position with respect to each other. Adhesive 20 includes a plurality of apertures 21 which allow for movement of actuator 10 therethrough to contact sheet 15 with sheet 18 thereby connecting printed circuit 16 with printed circuit 19.

The adhesive may be a film with appropriate die cut apertures 21. The film is adherent on both sides: one side of the film is placed in contact with one of the sheets 15 or 18 and then the other sheet is brought into contact with the other side of the film. Preferably, the film may be any one of the following, depending on the particular application: synthetic rubber base pressure sensitive; acrylic polymer base pressure sensitive; and silicone polymer base pressure sensitive. It should be understood that the adhesive may also be applied in liquid form to the surface of sheet 18 with appropriate masking for apertures 21; and subsequently, sheet 15 is positioned in contact with adhesive 20. Keyboard 17 is positioned on and secured relative to a supporting surface 22. Supporting surface 22 may represent a surface of a cash register with which the keyboard may be used; or surface 22 may be an integral part of the keyboard.

FIGS. 2 and 3 show respectively a key in the nonactuated position and the actuated position. When a downward force, F, is imposed on sheet 18, sheet 18 deforms downwardly. It should be understood that sheet 18 may include a legend printed on the surface of sheet 18 which indicates an actuation area. A person operating the keyboard applies an actuation force to this actuation area. It should be understood that the force may be applied off center from the tactile element 10 and still actuate the key. When an off center actuation force is applied to the key, the flat surface area 13 allows for the force to be relatively evenly distributed over the actuator area, thereby providing for actuation of the key (surface area 13 is best shown in FIG. 1). As shown in FIG. 3, the arcuately shaped dome portion 11 inverts while the dome actuating protrusion 12 does not invert. The reason protrusion 12 does not invert is that the walls of a cylinder will support heavy loads without collapse. However, it should be understood that protrusion 12, as shown in FIG. 3, may deform to a slight degree to accommodate the inversion of dome portion 11. By inversion, it is meant that the direction of the curvature of at least part of the wall of dome 11 is subject to rapid change. That is, the curvature of at least part of the wall of dome 11 undergoes a reversal in the direction of slope, and the reversal occurs suddenly to provide tactile feedback. Dome portion 11 travels downwardly for a very short distance before dome inversion occurs. As shown in FIG. 3, the direction of curvature of a part of arcuately shaped dome portion 11 changes, i.e., reverses. However, the dome actuating protrusion 12 does not invert.

As shown in FIGS. 2, 3 and 4, sheet 18 functions both as a printed circuit and as a legend sheet. It should be understood, that in some applications, it may be desirable to include an additional legend sheet 18(a) positioned above sheet 18. A separate legend sheet is desirable in the circumstance where the user desires to change the legend but does not desire to change the hardware beneath the legend.

FIG. 5 shows a side sectioned view of an actuator 10 positioned with dome 11 convex relative to the user, that is, protruding toward the user of the keyboard. It shuld be understood that the force, F, can be imposed by either a discrete key as is often done in calculators or by a legend sheet 18(a) as previously discussed. The keyboard shown in FIG. 5, is flipped 180° from that shown in FIG. 2 but is identical to the keyboard shown in FIG. 2 except that it is no longer necessary to print a legend on sheet 18. The dash lines show the actuator in the unactuated position with an optional legend sheet 18(a), and the solid lines show the actuator in the actuated position.

Research has determined that there is a range of preferred dimensions for the actuator of FIGS. 1-6. Referring to FIG. 6, the arcuately shaped dome preferably has the shape of a sphere having a radius R, which should be within the range of about 0.2 to about 1.0 inches. The sphere should protrude from the sheet a height H, of between about 0.010 and about 0.100 inches. The thickness of the sheet, t, should be between about 0.002 and about 0.007. The cylindrical protrusion should have a diameter, d, in the range of between about 0.060 to about 0.250 and a height, h, in the range of about 0.010 to about 0.060. The dimension D, is determined as a function of R and H. An illustrative construction at the present time is: $R=0.750$, $H=0.030$, $d=0.125$, $h=0.020$.

In general, an increase in the diameter, d, of the protrusion provides for actuation of the tactile element with a force applied further from the center of the tactile element. An increase in "d" should be accompanied by an increase in R and/or H to provide for tactile feedback. Generally speaking the height, h, of the protrusion is not critical to the tactility of the tactile element, but, h must be sufficiently large so that the cylindrical protrusion exists as a separate geometry. Maximum values of h are determined by the elongation characteristics of the plastic film. In general, if the thickness, t, is increased, R, H and/or d should be increased. A decrease in the required actuation force may be accomplished by decreasing t (with attendant decreases in R, H and/or d) or may be accomplished by decreasing the ratio of d/R.

Figure 7:
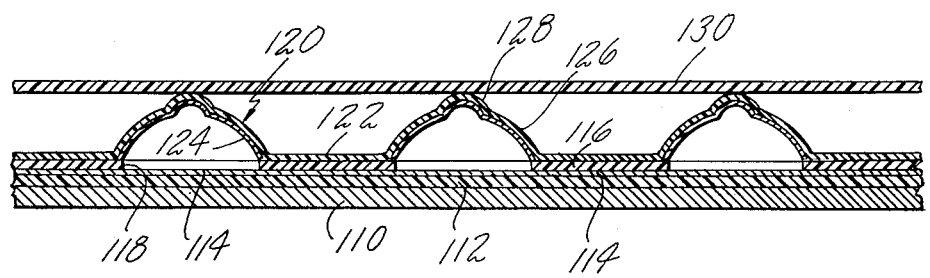
FIG. 7 is a sectional elevation view of a keyboard incorporating the new subject matter set forth herein over my parent U.S. Pat. No. 4,245,138.
Figure 8:
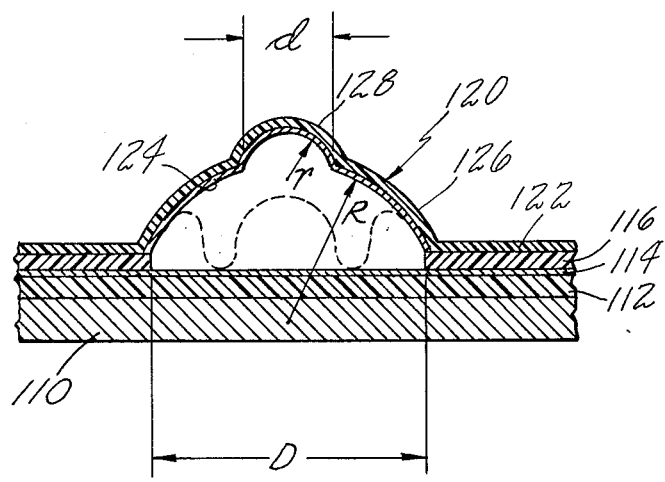
FIG. 8 is a view of a detail of FIG. 7.

Referring now to FIGS. 7 and 8, the new keyboard component and keyboard assembly of this continuation-in-part are shown. The keyboard assembly in FIG. 7 has a rigid backer or reinforcing board 110 which may be metal, hard plastic such as Bakelite, fiberboard, or other suitable support material. A layer of flexible plastic insulating material 112, such as Mylar or other suitable insulating material, is positioned on one side of backing board 110 and, preferably, is adhered to the backing board. Conductive printed circuit patterns 114, such as copper or conductive ink, are on the top side of insulating layer 112, plastic sheet 112 and conductive patterns 114 being, in effect, a unitary layer of printed circuitry. A plastic spacer 116 is positioned on top of sheet 112, and spacer 116 may be adhered to sheet 112. Plastic spacer 116 (which may also be Mylar) has a series of circular openings 118 each of which is aligned with a circuit pattern 114 and with an associated domed key element 120. The domed key elements 120 are protrusions formed in a sheet of unitary plastic (e.g., Mylar) material 122, and printed circuit patterns 124 of copper, ink or other suitable conductive material which extend along the underside of sheet 122 and extend into at least part of the underside of each dome. Sheet 122 is initially a flat piece of flexible printed circuitry having the circuit patterns 124. The domes may be formed with shaped tooling under heat and pressure by techniques known in the art. Flat (i.e., undomed) portions of sheet 122 may be adhered to spacer sheet 116.

Each dome 120 has a first arcuate or spherical dome portion 126 and a second dome shaped arcuate or spherical portion 128 extending from the top center of the first dome portion 126. Dome portion 126 constitutes an invertible dome portion, and dome portion 128 is a noninvertible dome shaped actuator for the invertible dome portion 126.

A flat cover sheet 130 of plastic (e.g., Mylar) is located and positioned to be in contact with the dome actuator 128 on top of each dome 120, and the upper portion of sheet 130 (i.e., the side not in contact with the domes) may have number, letters, or other key identifying indicia thereon to be read by the user of the keyboard.

A protrusion 120 and its associated circuitry on sheet 112 constitute, in effect, a key station. In operation of the keyboard of FIG. 7, the user locates the particular key station which is desired to be actuated (such as by reading the indicia on the top of sheet 130). The user then pushes downwardly on that key to bring conductor pattern 124 in contact with conductor pattern 114 to complete a circuit and generate an electrical signal from the keyboard. The delivery of an actuating force to the top of sheet 130 to a specific key results in the transmission of that force through the dome shaped actuator 128 to dome segment 126 to move dome segment 126 downward to bring part of the conductor 124 into contact with the conductor 114 to complete the electrical circuit. In this downward movement, at least a portion of dome 126 is inverted, as shown by the dotted lines in FIG. 8 which correspond to the downward or actuated position of dome 120. That is, while dome portion 126 in its unactuated position has a convex curvature as viewed from above, at least a part of the dome portion 126 is inverted in the actuated position so that the curvature is reversed, i.e., concave when viewed from above. Stated in another way, the slope of the curve of dome 126 is positive in the unactuated condition, whereas the slope of at least part of the dome portion 126 is negative in the actuated position. The inversion occurs with a snap action so the user experiences a tactile feedback as the dome segment 126 is moved downward to complete electrical contact between conductors 124 and 114. The upper dome segment 128 does not invert during actuation of the dome. Rather, the upper dome segment 128 acts as an actuator for the key and functions to transmit the actuating force to the lower dome segment 126.

This result wherein the upper dome segment 128 is non-invertible (under normal actuating loads) while the lower dome segment 126 is at least partially inverted is the result of the relative dimensioning of the two dome segments. This relative dimensioning is shown in detail in FIG. 8 wherein a preferred dome configuration is shown. In the dome configuration of FIG. 8; the radius "R" of the major dome section 126 is in a range between 0.200 inches and 1.0 inches (with one illustrative embodiment being 0.750 inches); the height "H" of the major dome segment 126 is in a range between 0.010 inches and 0.100 inches (with one illustrative embodiment being 0.030 inches); the radius "r" of the minor domed segment 128 is in a range between 0.030 inches and 0.125 inches (with one illustrative embodiment being 0.0625 inches); and the height "h" of the minor upper dome segment 128 is in a range between 0.010 inches and 0.060 inches (with one illustrative embodiment being 0.020 inches). The thickness of sheet 122 is between 0.002 and 0.007 inches. The dimension "D" of the major dome segment 126 is determined as a function of R and H, and the dimension "d" of the minor dome segment 128 is determined as a function of r and h.

While the thickness t of the sheet may vary, it is a critical requirement that the dimensions of the major dome segment 126 and the minor dome segment 128 remain in the ratio of the ranges set forth above, or with appropriate adjustment for changes in thickness t beyond that set forth above. Within those ranges, the key configuration of this invention will function so that under normal operating forces at least a part of major dome segment 126 will invert under normal actuating forces while minor dome segment 128 will serve as a force transmitter and will not invert.

An important aspect of all configurations of this invention is that it achieves appropriate key action with tactile response even though the actuating force may be off center. Thus, for example, even if the actuating force applied to a particular dome is somewhat off center of the dome, i.e., not applied to sheet 130 directly above the dome to be actuated and not directly in the downward direction with respect to that dome, the actuator dome 128 translates enough of the actuating force into the downward direction to actuate the major dome portion 126 and achieve the desired tactile response. This is a significant advantage over many prior art configurations wherein tactile response may be poor or not be experienced at all if a plastic spherical dome key is actuated off center.

While preferred embodiments have been shown and described, various modifications and substitutions may be made thereto without departing from the spirit and scope of the present invention. Accordingly, it should be understood that the present invention has been described by way of illustraton and not limitation.

What is claimed is:

1. A tactile snap action electrical switch element comprising:
   a sheet of base material; and
   at least one snap action protrusion formed in and extending from said sheet of base material, said protrusion having first and second arcuately shaped domes of different radii, the surface of said second dome being smooth and uninterrupted and the surface of said first dome being smooth and interrupted only at the circular junctions with the sheet of base material and the second dome, said first dome extending from and being integral with said sheet of base material, said second dome extending from and being integral with said first dome, said first dome being at least partly inverted by applying a pressure against said second dome, said second dome having a smaller radius than said first dome, the ratio of the radius of said second dome to that of the first dome being selected such that said second dome will not be inverted by said applied pressure, said second dome being a non-invertible actuator for said first dome.

2. A tactile switch element as in claim 1 wherein:
said second dome extends from the center of said first dome.

3. A tactile switch element as in claim 2 wherein:
each of said first and second domes is a portion of a sphere.

4. A tactile switch element as in claim 3 wherein:
said first dome is a portion of a sphere of larger radius than said second dome.

5. A tactile switch element according to claim 4 wherein:
the radius, R, of the first dome is in the range of between 0.2 and 1.0 inches;
the height, H, of the first dome is in the range of between 0.010 and 0.100 inches;
the radius, r, of the second dome is in the range of between 0.030 and 0.125 inches;
the height, h, of the second dome is in the range of between 0.010 and 0.060 inches; and
the thickness, t, of the element is in the range of between 0.002 and 0.007 inches.

6. A snap action electrical switch element which is capable of being inverted by an actuation force to provide tactile feedback, the element having a sheet of base material, and at least one snap action protrusion formed in said base material, said protrusion having a first domed contour and a second domed contour, said first domed contour being invertible to provide tactile feedback and said second domed contour resisting inversion when the actuation force is imposed upon the element.

7. A switch element according to claim 6 wherein said second domed contour extends from the center of said first domed contour.

8. A switch element as in claim 7 wherein:
each of said domed contours is a portion of a sphere.

9. A switch element as in claim 8 wherein:
said first domed contour is a portion of a sphere of larger radius than said second domed contour.

10. A switch element according to claim 8 wherein:
the radius, R, of the first dome is in the range of between 0.2 and 1.0 inches;
the height, H, of the first dome is in the range of between 0.010 and 0.100 inches;
the radius, r, of the second dome is in the range of between 0.030 and 0.125 inches;
the height, h, of the second dome is in the range of between 0.010 and 0.060 inches; and
the thickness, t, of the element is in the range of between 0.002 and 0.007 inches.

11. A tactile snap-action key which is movable between an opened and closed position to open and close an electrical circuit, said key comprising:
a sheet of base material;
a tactile element formed in said sheet of said base material and including a first arcuately shaped invertible dome and a dome actuating protrusion means, said dome actuating protrusion means being a second arcuately shaped dome which is integral with and extending from said first dome, said first dome being inverted by applying a pressure against said second dome, said second dome having a smaller radius than said first dome, the ratio of the radius of said second dome to the radius of the first dome being selected such that said second dome will not be inverted by said applied pressure, said first dome providing for tactile feedback when it is inverted, the surface of said second dome being smooth and uninterrupted and the surface of said first dome being smooth and interrupted only by the circular junctions with said sheet of base material and the second dome;
first conductive means being associated with said first dome; and
second conductive means, said second conductive means being aligned with and facing said first conductive means, the actuation of the key providing said applied pressure against said second dome which at least partly inverts said first dome establishing electrical contact between said first conductive means and said second conductive means.

12. A key according to claim 11 wherein said first conductive means comprises a printed circuit formed on the surface of said first dome and said second conductive means comprises a printed circuit positioned in alignment with said first conductive means to provide for electrical contact between the first and second printed circuits when said first dome is inverted.

13. A tactile key as in claim 11 wherein:
said second dome extends from the center of said first dome.

14. A tactile key as in claim 13 wherein:
each of said first and second domes is a portion of a sphere.

15. A tactile key as in claim 14 wherein:
said first dome is a portion of a sphere of larger radius than said second dome.

16. A tactile key as in claim 15 wherein:
the radius, R, of the first dome is in the range of between 0.2 and 1.0 inches;
the height, H, of the first dome is in the range of between 0.010 and 0.100 inches;
the radius, r, of the second dome is in the range of between 0.030 and 0.125 inches;
the height, h, of the second dome is in the range of between 0.010 and 0.060 inches; and
the thickness, t, of the element is in the range of between 0.002 and 0.007 inches.

17. A keyboard comprising:
a flexible first sheet of printed circuitry having a plurality of tactile elements, each element including a first arcuately shaped dome which is integral with and extends outwardly from said first sheet and a dome actuating protrusion means which is integral with and extends from said first dome, said dome actuating protrusion means being a second arcuately shaped dome, said first and second domes meeting at a circular junction and having smooth uninterrupted surface contours, said first dome being at least partly inverted by applying a pressure against said second dome, said second dome having a smaller radius than said first dome, said radius of said second dome being sufficiently less than the radius of said first dome to prevent inversion of said second dome by said applied pressure;
a portion of printed circuitry carried by each of said first domes; and
circuit means aligned with said tactile elements and retained with respect to said first sheet, the printed circuit portions carried by said first domes contacting the circuit means when each of said first domes is partly inverted.

18. A keyboard according to claim 17 wherein the circuit means comprises a second sheet of printed circuitry, the printed circuitry on the first sheet being selectively insulated from the printed circuitry of the second sheet to allow connection of the printed circuitry only when the domes are inverted.

19. A keyboard according to claim 18 wherein said first sheet of printed circuitry comprises a sheet having printed circuitry on one surface thereof and said second sheet comprises a sheet of printed circuitry having printed circuitry on one surface thereof, said first and second sheets being aligned so that the printed circuitry of the first sheet faces the printed circuitry of the second sheet, said printed circuitry of the first sheet being separated from the printed circuitry of the second sheet by insulating means, said insulating means including a plurality of apertures aligned with said first domes to allow for contact of the first printed circuitry with the second printed circuitry when said first domes are inverted.

20. A keyboard as in claim 17 wherein:

said second dome extends from the center of said first dome.

21. A keyboard as in claim 20 wherein:

each of said first and second domes is a portion of a sphere.

22. A keyboard as in claim 21 wherein:

said first dome is a portion of a sphere of larger radius than said second dome.

23. A keyboard as in claim 22 wherein:

the radius, R, of the first dome is in the range of between 0.2 and 1.0 inches;

the height, H, of the first dome is in the range of between 0.010 and 0.100 inches;

the radius, r, of the second dome is in the range of between 0.030 and 0.125 inches;

the height, h, of the second dome is in the range of between 0.010 and 0.060 inches; and the thickness, t, of the element is in the range of between 0.002 and 0.007 inches.

* * * * *